(12) United States Patent
Lethin

(10) Patent No.: US 11,795,694 B2
(45) Date of Patent: Oct. 24, 2023

(54) STABILIZING SUPPORT STRUCTURAL COLLAR SYSTEM

(71) Applicant: Douglas Lethin, Salem, OR (US)

(72) Inventor: Douglas Lethin, Salem, OR (US)

(73) Assignee: SAGE BRACKET SOLUTIONS, LLC, Salem, OR (US)

( * ) Notice: Subject to any disclaimer, the term of this patent is extended or adjusted under 35 U.S.C. 154(b) by 0 days.

(21) Appl. No.: 16/922,938

(22) Filed: Jul. 7, 2020

(65) Prior Publication Data

US 2021/0324632 A1    Oct. 21, 2021

Related U.S. Application Data

(60) Provisional application No. 63/013,093, filed on Apr. 21, 2020.

(51) Int. Cl.
*E04D 13/00* (2006.01)
*F16M 13/02* (2006.01)

(52) U.S. Cl.
CPC .......... *E04D 13/00* (2013.01); *F16M 13/02* (2013.01)

(58) Field of Classification Search
CPC ................................ E04D 13/00; F16M 13/02
USPC ....... 248/218.4, 219.3, 219.4, 220.1, 60, 62, 248/63, 64, 57, 48.1, 505, 507, 300, 58, 248/61, 237; 52/712, 219
See application file for complete search history.

(56) References Cited

U.S. PATENT DOCUMENTS

| | | | |
|---|---|---|---|
| 1,362,244 A * | 12/1920 | John | F16L 3/14 248/59 |
| 1,805,006 A * | 5/1931 | Neilon | F16L 3/1075 248/62 |
| 2,350,433 A * | 6/1944 | Vernon | G09F 7/18 40/607.11 |
| 2,459,644 A * | 1/1949 | Heidebrecht | H02G 1/04 174/45 R |
| 2,542,172 A * | 2/1951 | Wold | F16L 3/14 428/573 |
| 3,889,441 A * | 6/1975 | Fortine | E04B 1/41 52/715 |
| 4,245,806 A * | 1/1981 | Vangreen | F16L 3/133 248/59 |
| 4,665,672 A * | 5/1987 | Commins | E04B 1/2608 52/295 |
| 5,640,822 A * | 6/1997 | Haswell | E04B 1/2608 52/702 |
| 6,202,962 B1 * | 3/2001 | Snyder | F16L 3/137 24/16 PB |
| 6,398,170 B1 * | 6/2002 | Wada | F16L 3/123 248/68.1 |
| 7,188,809 B1 * | 3/2007 | Roth | F16B 7/0433 248/58 |
| 7,559,512 B1 * | 7/2009 | diGirolamo | F16L 3/1233 24/23 R |
| 7,819,364 B2 * | 10/2010 | Duggan | F16L 3/12 248/74.3 |
| 8,033,512 B2 * | 10/2011 | Lien | F16L 3/04 248/74.5 |
| 8,534,002 B2 * | 9/2013 | McDow, Jr. | E04D 13/1476 52/58 |

(Continued)

*Primary Examiner* — Kimberly T Wood
(74) *Attorney, Agent, or Firm* — Columbia IP Law

(57) ABSTRACT

Technologies and implementations for a support collar facilitating various mechanical strengths is provided.

14 Claims, 5 Drawing Sheets

(56) References Cited

U.S. PATENT DOCUMENTS

| | | | |
|---|---|---|---|
| 8,894,023 B2 * | 11/2014 | Dann | F16L 3/127 |
| | | | 248/74.4 |
| 9,127,787 B1 * | 9/2015 | Thackeray | F16L 3/223 |
| 9,611,954 B2 * | 4/2017 | Malaspina | F16L 3/123 |
| 2007/0215141 A1 * | 9/2007 | Kopp | F23J 13/00 |
| | | | 126/315 |
| 2014/0318891 A1 * | 10/2014 | Crothers | E04F 11/1808 |
| | | | 182/113 |

* cited by examiner

STABILIZING SUPPORT STRUCTURAL COLLAR SYSTEM

RELATED APPLICATION

This application claims benefit of priority to U.S. Provisional Patent Application Ser. No. 63/013,093, filed Apr. 21, 2020, titled STABILIZING SUPPORT STRUCTURAL COLLAR SYSTEM, which is incorporated herein by reference in its entirety.

This application is related to U.S. Provisional Patent Application Ser. No. 62/837,699, filed on Apr. 23, 2019, titled STABILIZING ELEVATED ROOF SUPPORT, which is incorporated herein by reference in its entirety.

INFORMATION

Construction and fabrication may involve utilization of support structures. The support structures may be of a variety of shapes, sizes, and orientations. An example of a support structure may be a vertical support structure. The vertical support structure may be utilized to take the load of an object. In construction such as, but not limited to, construction of a house, the vertical support structures may be utilized to help facilitate support of a load of a roof related structure.

For example, a house may commonly include a roof, and it may be desirable to modify the roof to accommodate various needs. For example, it may be desirable to extend an area covered by a roof to facilitate additional covered area for the house. An example method of adding or modifying a roof may be to add an additional roof over an existing roof, where the additional roof may extend beyond the existing roof to provide coverage over a previously exposed area around the structure. In order to facilitate the addition of an additional roof over an existing roof, various systems may be utilized.

One example of an additional roof system may involve supports, where the supports may be in the form of vertical struts to help facilitate the bearing of a load of the additional roof. Because of the importance of a roof, the additional roof system may meet various requirements such as, but not limited to, mechanical requirements. Some examples of mechanical requirements may include vertical support strength, horizontal support strength, sheer strength, torque strength, corrosion resistance, etc. The vertical strut type supports, that may be utilized to facilitate bearing of the load for modifying an existing roof (e.g., a secondary/alternate roof disposed on top of an existing roof), may be vertical strut type structures that may facilitate elevating a secondary/alternate roof above an existing roof. Since the strut type structures may support a load associated with secondary/elevated roof, attaching the struts to the existing structure may be a challenging aspect of elevating a secondary/alternate roof.

SUMMARY

Described herein are various illustrative apparatus for a structural collar. Example apparatus may include a sheet metal having a first substantially flat portion and a second a second substantially flat portion. The first substantially flat portion and the second substantially flat portion may have holes configured to facilitate substantial alignment of the first substantially flat portion and the second substantially flat portion on top of each other. Additionally, the structural collar may include a bend portion between the first substantially flat portion and the second substantially flat portion. The bend portion may be configured to substantially wrap around a body of a support structure and to bind against at least two pinch points around the body of the support structure when the first substantially flat portion and the second substantially flat portion are substantially aligned.

The present disclosure also describes a method of forming a structural collar from a single sheet metal. The method may include forming a first flat portion, forming a second flat portion, and forming a rectangular portion. The rectangular portion may be configured to couple the first flat portion at one end and the second flat portion at an opposite end. Additionally, the method may include bending the rectangular portion to substantially match a body of the of a support structure and bending the first substantially flat portion and the second substantially flat portion at an angle relative to a vertical reference of the body of the support structure.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments, in accordance with the disclosure and are, therefore, not to be considered limiting of its scope, the disclosure will be described with additional specificity and detail through use of the accompanying drawings.

In the drawings.

DETAILED DESCRIPTION

Figure 1:
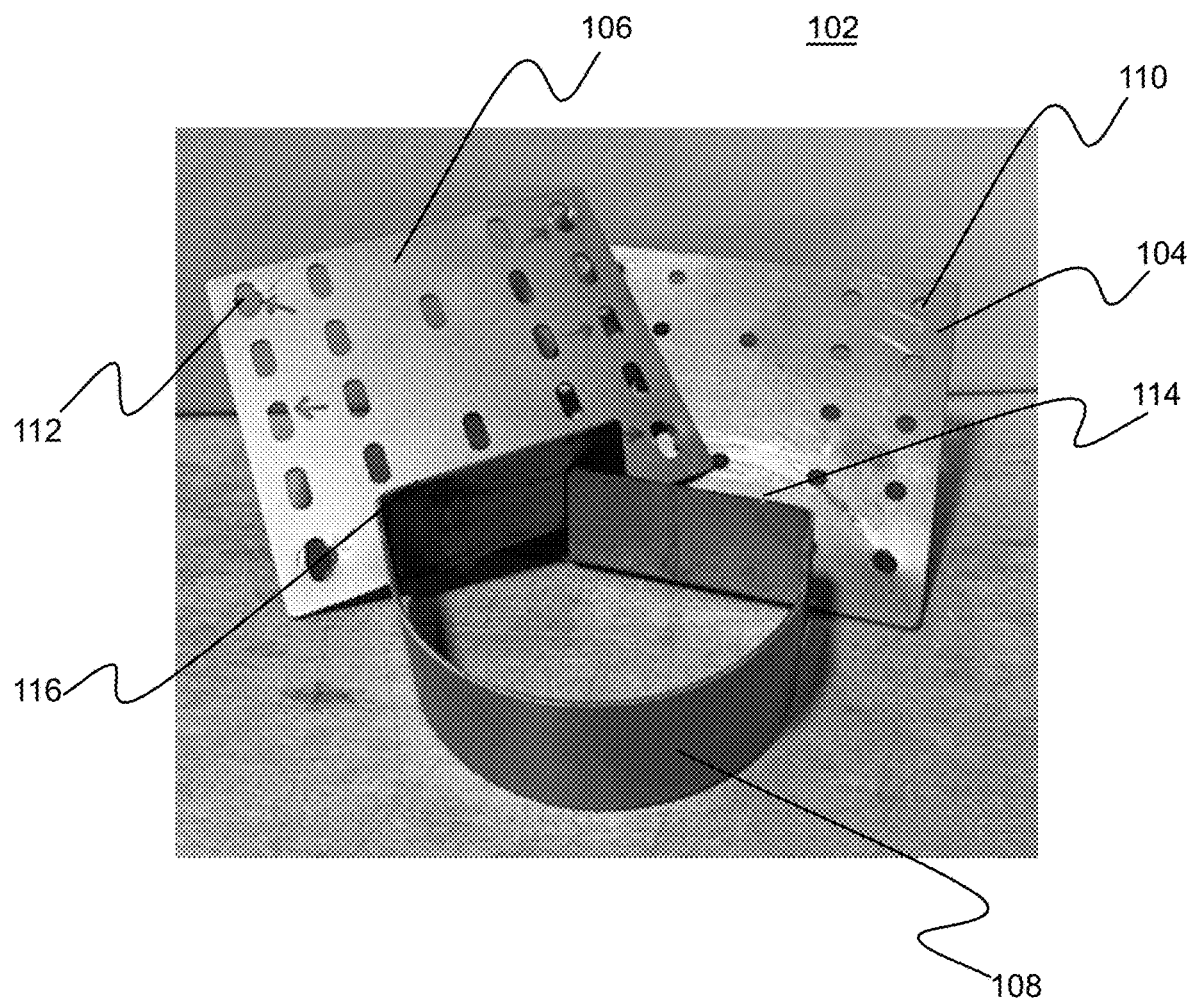
FIG. 1 illustrates a structural collar, in accordance with various embodiments.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, and/or components have not been described in detail in order to avoid unnecessarily obscuring the claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to apparatus, and systems related to a providing stabilization of a support structure.

Support structures may be utilized in facilitating remodeling of structures such as, but not limited to, roofs. The support structures may provide the mechanical structural support for a secondary/alternate roof over an existing roof.

Before turning to the figures, a non-limiting example application of the various embodiments of the present disclosure may be described. In the non-limiting example, a structure such as, but not limited to, a dwelling (hereon out, house). A house may have various components including a roof. The roof may be configured to cover the house to a certain point. Continuing with this non-limiting example scenario, the house may be a one story house having a porch in front of the house. The roof may cover the house and a periphery of the house. However, the roof may not provide coverage over the porch, and accordingly, a secondary/alternate roof may be desired to facilitate coverage over the porch. In this example, a secondary roof that may extend the peripheral coverage of the original roof may be a solution to extending the coverage by the original roof (i.e., provide cover for the porch).

The secondary roof may be a roof like structure supported above the original roof. The roof like structure may be supported by a supporting apparatus such as, but not limited to a support apparatus available from SkyLift™ Roof Riser Hardware of Salem, Oreg. In this non-limiting example, the support apparatus available from SkyLift™ may be referred to as a "riser" similar to the apparatus disclosed in U.S. patent application Ser. No. 13/399,263, filed Feb. 17, 2012, having the title Elevated Roof and U.S. patent application Ser. No. 14/741,353, filed Jun. 16, 2015, having the title Elevated Roof. Both U.S. patent application Ser. Nos. 13/399,263 and 14/741,353 are incorporated by reference in their entirety. The riser may be utilized to support a secondary roof over an existing roof. Additionally, the riser may be attached to a load bearing part of the house (e.g., part of a frame of the house configured to support the existing roof).

Continuing with non-limiting example of the secondary roof being elevated above the existing roof, the risers may be attached to a load bearing structural component of the house (e.g., load bearing frame of the house configured to at least facilitate support of the secondary roof). As disclosed in the patent applications incorporated herein, the risers may be configured to penetrate through the existing roof and attach to the load bearing structure (e.g., a load bearing frame/wall of the house). Accordingly, several of the mechanical properties to support the secondary roof may be provided by the risers (e.g., vertical strength). However, a mechanical property that may be further enhanced may be lateral support strength (e.g., support being substantially perpendicular to the riser). Since the riser may be configured to penetrate through the existing roof, the riser may be in proximity to a roof support frame structure such as, but not limited to, one or more rafters.

For this non-limiting example scenario, the riser may be placed on a load bearing wall, where the riser may extend up between two rafters. The two rafters may be spaced a predetermined distance from each other underneath the roof to help facilitate structural support. Additionally, the rafters may have angled surfaces to match a pitch (or slope) of the roof. A board such as, but not limited to, a 2 inch by 6 inch board may be trimmed to substantially match the predetermined distance between two rafters. The board may be placed at an angle to lie flush along angled surfaces of the rafters (i.e., the 6 inch flat surface of the board being flush with the pitch of the roof). The board may be positioned abut to the riser (e.g., at least one point touching the riser). The board may be attached to both rafters (e.g., toenailed to the rafters on both ends of the board). Once the riser and the board are attached as described, a structural collar may be introduced to the system, in accordance with various embodiments.

A structural collar, which has two substantially flat portions with a bend portion between the two flat portions, may be wrapped around the riser. The bend portion may be configured to substantially match the shape of the riser. For example, the riser may have a circular shape (e.g., circular tube or circular rod), and accordingly, the bend portion may have a circular type shape. When the collar is "closed" (i.e., the two flat portions brought together around the riser) the bend portion may be configured to pinch against the riser on at least two points. Additionally, the two flat portions may have several holes that may be positioned to facilitate alignment of at least a portion of the holes when the two flat portions are placed on top of each other. The two flat portions may be configured to substantially match the angle of the angled surfaces of the rafters as described above. Accordingly, the two flat portions may also lie flush with the angled surfaces of the rafters (i.e., lie flat on the 6 inch flat surface of the board being flush with the pitch of the roof). The two flat surfaces, which are on top of each other, may be attached to the 6 inch flat surface via one or more aligned holes (e.g., a screw or nail going through an aligned hole into the 6 inch flat surface of the board). Alternatively, the two flat portions may be attached to a surface disposed on top of the 6 inch flat surface such as, but not limited to, a roofing base (e.g., fibrous material such as, but not limited to, a wood material including plywood, pressboard, solid wood, metal plate, plastic plate, and so forth plywood).

The system described in the non-limiting scenario above may facilitate mechanical support strength in the vertical and horizontal direction. In accordance with the various embodiments of the present disclosure, lateral support strength (i.e., horizontal direction) of a riser like apparatus may be further enhanced.

Turning now to the figures, FIG. 1 illustrates a structural collar, in accordance with various embodiments. In FIG. 1, a structural collar 102 may have two flat portions, a first flat portion 104 and a second flat portion 106. Between the first flat portion 104 and the second flat portion 106, a bend portion 108 may be the first flat portion 104 and the second flat portion 106. The first flat portion 104 and the second flat portion 106 may include one or more holes, a first set of holes 110 in the first flat portion 104 and a second set of holes 112 in the second flat portion 106. The first set of holes 110 and the second set of holes 112 may be aligned when the first flat portion 104 and the second flat portion 106 are placed over each other in an overlapping fashion as will be described later. In the example shown, the bend portion 108 may have a circular type shape. The circular type shape of the bend portion 108 may at least partially correspond to the shape of a support (e.g., a support 302 shown in FIG. 3) the structural collar 102 is to wrap around to provide stabilizing support.

Continuing with the example of the riser (e.g., support 302) as described above and shown in FIG. 3, the riser may have a round body shape. Accordingly, the bend portion 108 may have the circular type shape shown. Once the first flat portion 104 and the second flat portion 106 are at least partially overlapped wrapping around the riser, the bend portion 108 may pinch on at least two points on the riser body (e.g., a support body 306 shown in FIG. 3). The pinch may be facilitated by a first pinch point 114 and a second pinch point 116. In the example shown, the first pinch point 114 may be coupled to the first flat portion 104 and the second pinch point 116 may be coupled to the second flat portion 106. As shown, the first pinch point 114 and the second pinch point 116 may have a substantially flat shape forming a substantially semicircle with the bend portion 108 wrapping around the riser. When the structural collar 102 is wrapped around a support (e.g., support 302), the structural collar 102 may provide stabilizing support, in accordance with various embodiments.

It should be appreciated that the bend portion may be of a wide variety of shapes (e.g., square, rectangular, elliptical, etc.) to at least partially correspond to the shape of a support (e.g., a support 302) to be wrapped with the structural collar 102. Additionally, the first set of holes 110 and the second set of holes 112 may have different shaped holes. As shown, the first set of holes 110 in the first flat portion 104 may have a substantially circular shape, while the second set of holes 112 in the second flat portion 106 may have a substantially elliptical shape. In this example, the two different shapes of the first set of holes 110 and the second set of holes 112 may be configured to facilitate some play with respect to the alignment of the first set of holes 110 with the second set of holes 112 when the first substantially flat portion 104 and the second substantially flat portion 106 are overlapped. Accordingly, when the first substantially flat portion 104 and the second substantially flat portion 106 are overlapped, the first set of holes 110 and the second set of holes 112 may be not be perfectly aligned, but instead, may be partially, nearly, or substantially aligned due to the different shapes of the holes (e.g., the first set of holes 110 and the second set of holes 112).

Figure 2:
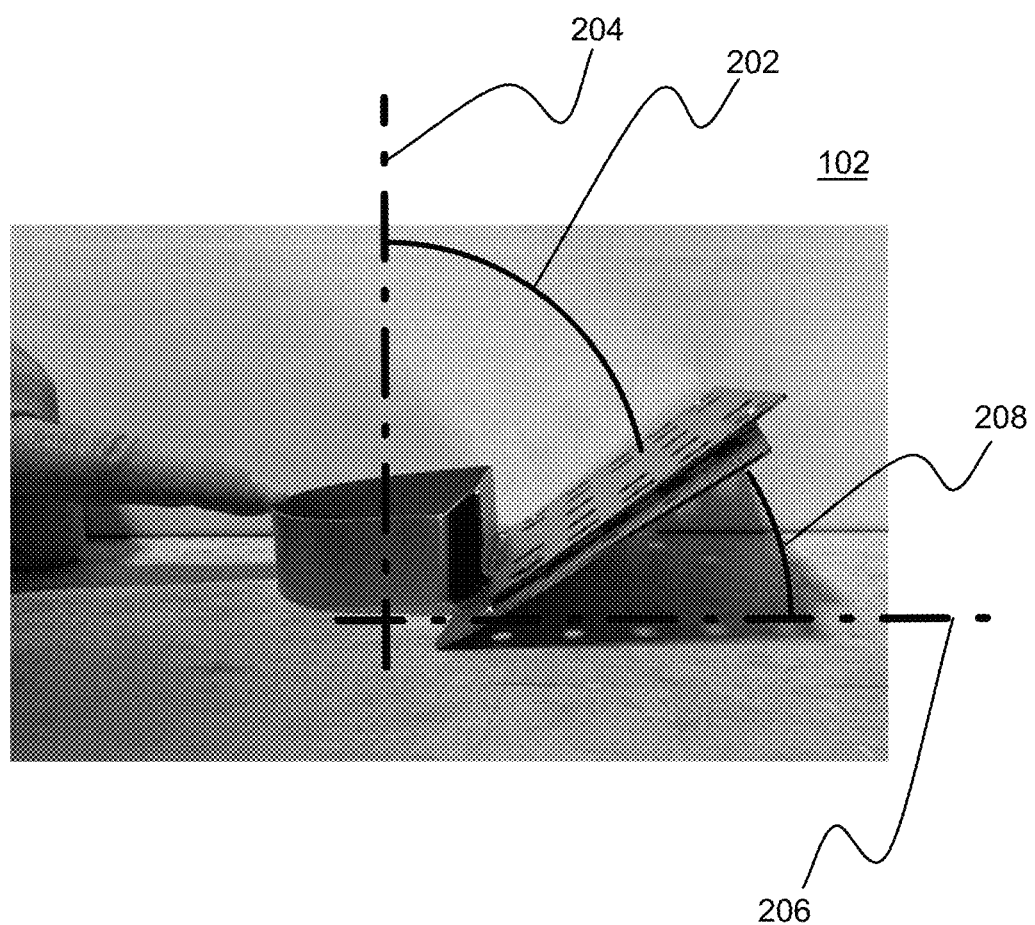
FIG. 2 illustrates side view of a structural collar, in accordance with various embodiments.

FIG. 2 illustrates side view of a structural collar, in accordance with various embodiments. As previously described, the structural collar 102 may have the first flat portion 104 and the second flat portion 106. Shown in FIG. 2, the structural collar 102 may have the first flat portion 104 and the second flat portion 106 configured at an angle 202 relative to a vertical reference line 204. The vertical reference line 204 may be substantially parallel to a support (e.g., support 302). For example, the structural collar 102 may be configured to wrap around the riser, and a centerline of the riser may be the vertical reference line 204 for determining the angle 202. Alternatively, a horizontal reference line 206 may be used to determine an angle from the horizontal 208. As shown, the horizontal reference line 206 may be substantially perpendicular relative to the vertical reference line 204 (i.e., substantially perpendicular to the centerline of the support). As will be described, the first flat portion 104 and the second flat portion 106 configured at the angle 202 may substantially match angled surfaces of a rafter (e.g., pitch of a roof) facilitating a substantially flush attachment of the first flat portion 104 and the second flat portion 106 along a roof.

It should be appreciated that the side view shown in FIG. 2, is but one example of an angle of the first flat portion 104 and the second flat portion 106. In the example of FIG. 2, the first flat portion 104 and the second flat portion 106 may have an angle substantially matching the pitch of the roof, while the bend portion may be substantially vertical around the body of the support (e.g., flat around the body of the support). As shown, the first flat portion 104 and the second flat portion 106 may be configured to partially overlap and be placed on top of each other. As described above, once the first flat portion 104 and the second flat portion 106 are partially overlapped, the first set of holes 110 and the second set of holes 112 may be aligned. It should be appreciated that the angle (e.g., the angle 202 and/or the angle from the horizontal 208) of the first flat portion 104 and the second flat portion 106 may be a wide variety of angles and be relative to a variety of references to at least partially correspond to a pitch of a roof and/or angled surfaces of a rafter such as, but not limited to, low pitched roofs (e.g., below 3.5:12), medium pitched roofs (e.g., 3.5:12 to 7.5:12), and steep pitched roofs (e.g., pitch above 7.5:12) in accordance with various embodiments. Accordingly, the claimed subject matter is not limited in this respect.

Figure 3:
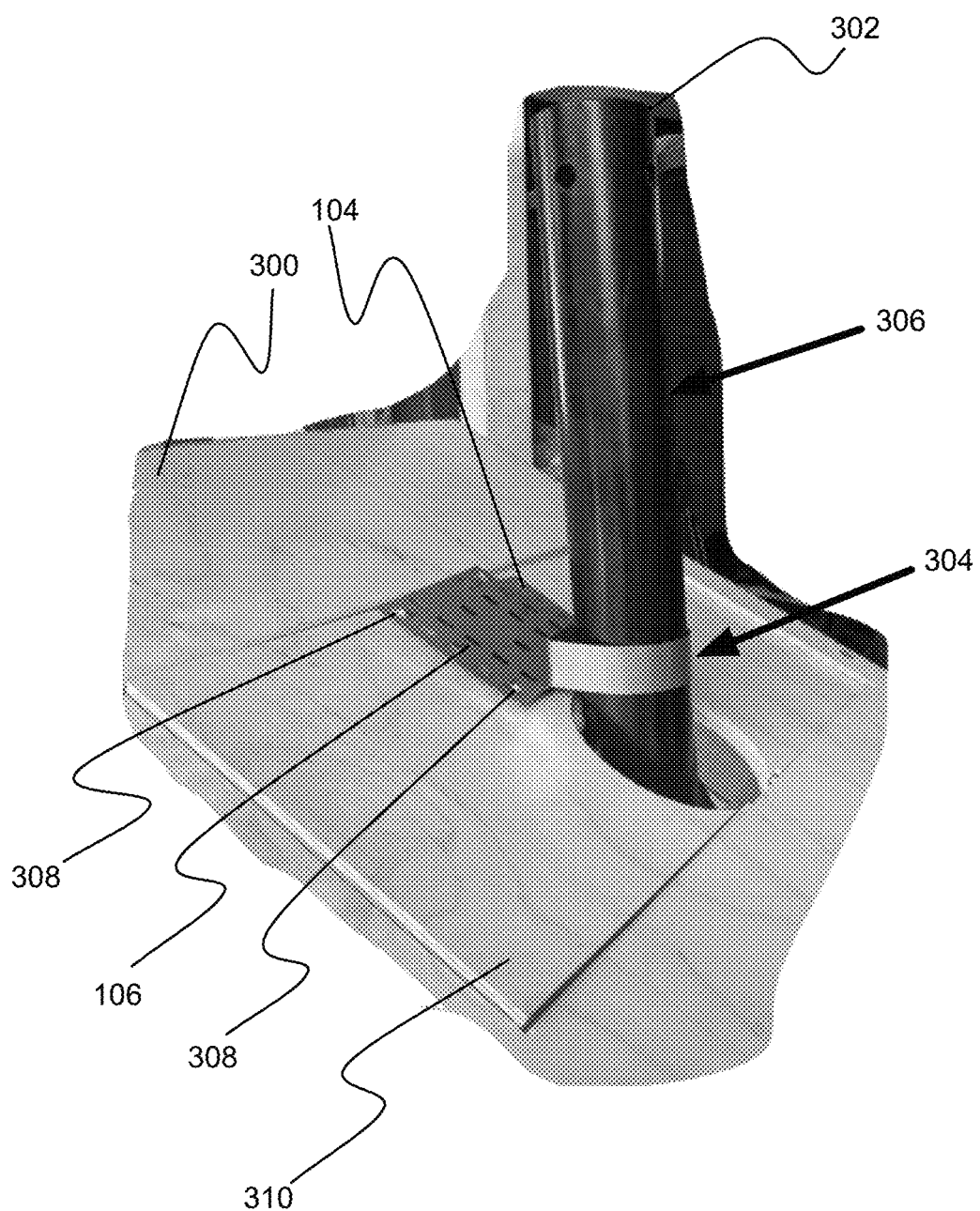
FIG. 3 illustrates a support system, in accordance with various embodiments.

FIG. 3 illustrates a support system, in accordance with various embodiments. Shown in FIG. 3, a structure such as, but not limited to, a roof structure 300 may include a support 302 such as, but not limited to, a riser available from SkyLift™ of Salem, Oreg. The support 302 may extend out above the roof structure 300. Around the support 302, a structural collar 304 may be wrapped around a body 306 of the support 302. The support 302 may be placed between two rafters as described above. The structural collar 304 may be wrapped around the body of the support 302 with the first flat portion 104 and the second flat portion 106 substantially aligned and overlapping as shown. Additionally, one or more fasteners 308 may be utilized to attach the first flat portion 104 and the second flat portion 106 on the roof structure 300. As previously described, one or more fasteners 308 may be attached to the plywood and/or through the plywood to a board underneath the plywood.

In the example shown in FIG. 3, a roofing base 310 (e.g., plywood) may be placed over the hole created to accommodate the support 302 (e.g., support's substantially rectangular base/unified pedestal base). Additionally, the roofing base 310 may be fitted to cover a board (not shown) attached between two rafters (not shown), and the first flat portion 104 and the second flat portion 106, being at least partially overlapping, may be attached to the roofing base 310 and/or through the plywood to the board underneath the roofing base 310 as previously described above. The attachment may be achieved by a wide variety of attachment methodologies such as, but not limited to, screws, bolts, and/or nails through one or more of the aligned holes. Accordingly, lateral support strength of the support 302 (e.g., riser) like apparatus may be further enhanced, in accordance with various embodiments.

Figure 4A:
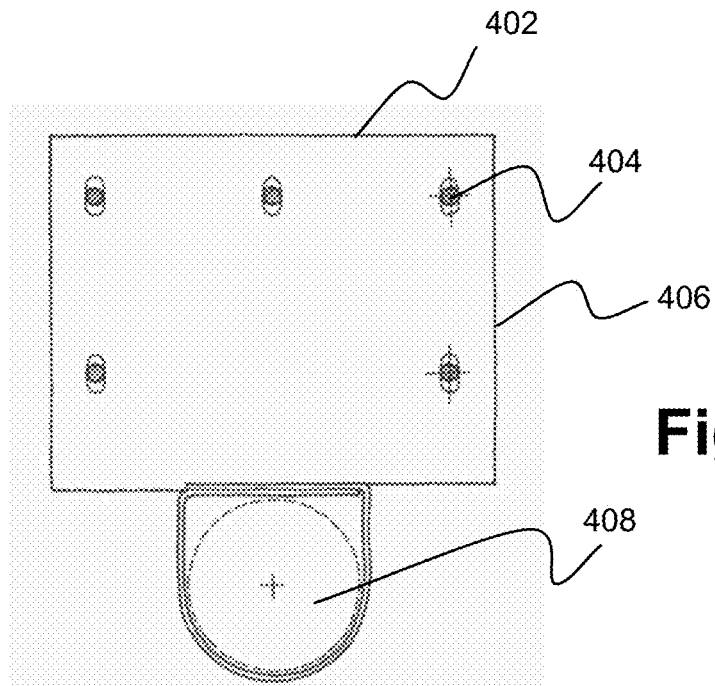
FIGS. 4A and 4B illustrate a view of a top view of some various configurations of a structural collar, in accordance with various embodiments.
Figure 4B:
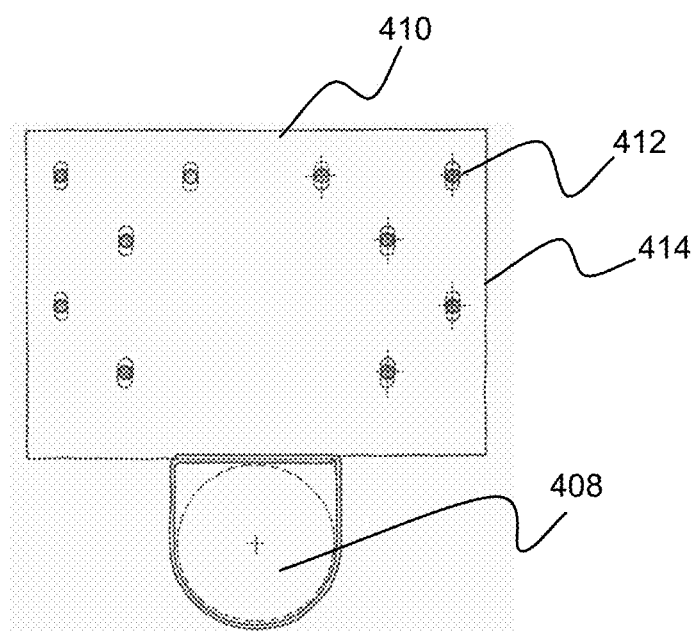

FIGS. 4A and 4B illustrate a view of a top view of some various configurations of a structural collar, in accordance with various embodiments. In FIG. 4A, a top view of a structural collar 402 may include 5 holes 404 in substantially overlapping two flat portions 406 of a structural collar 400. In one example, the 5 holes 404 may be aligned as shown (e.g., all 5 holes aligned when the overlapping two flat portions 406 are on top of one another). In another example, all 5 holes 404 may not all be aligned, but instead, at least one, two, or three, etc., of the 5 holes 404 may be aligned. In yet another example, the 5 holes 404 may be not be aligned at all, where the two flat portions 406 may be attached to a flat surface without alignment (e.g., offset and spread out at an angle). If the structural collar 402 pinches a support 408 in at least two points, the structural collar 402 may provide the desired strength to the support 408.

FIG. 4B illustrates a top view of a structural collar 410 having 10 holes 410 in two flat portions 414 of the structural collar 410. In one example, the 10 holes 412 may be aligned as shown (e.g., all 10 holes aligned when the two flat portions 414 are overlapping and on top of one another). Here again, the 10 holes 412 may be not all be aligned, but instead, at least one, two, three, four, five, etc., of the 10 holes 412 may be aligned. In yet another example, the 10 holes 412 may be not be aligned at all, where the two flat portions 414 may be attached to a flat surface without alignment (e.g., offset and spread out at an angle). Accordingly, it should be appreciated that the number holes and their configurations may be based at least in part on the desired structural collar to be used in various support systems.

As previously described, in FIGS. 4A and 4B, the holes 404 and 412 may have different shapes to facilitate accommodation of play in alignment of the holes (i.e., overlapping of the two flat portions 406 and 414). The holes 404 and 412 may have a variety of sizes to accommodate a variety of fasteners such as, but not limited to, variety of types of screws, rivets, etc. and may be of various sizes and shapes (e.g., #8 to #14) and/or structural fasteners of ¼ inch category. Additionally, the pattern of the holes 404 and 412 may be shown as a substantially square pattern, but it is contemplated within the scope of the disclosure that the pattern of the holes 404 and 412 may be a variety of patterns such as, but not limited to, a substantially "V" pattern, a substantially rectangular patter, a substantially circular pattern, a substantially elliptical pattern, etc. Accordingly, the claimed subject matter is not limited in these respects.

Figure 5:
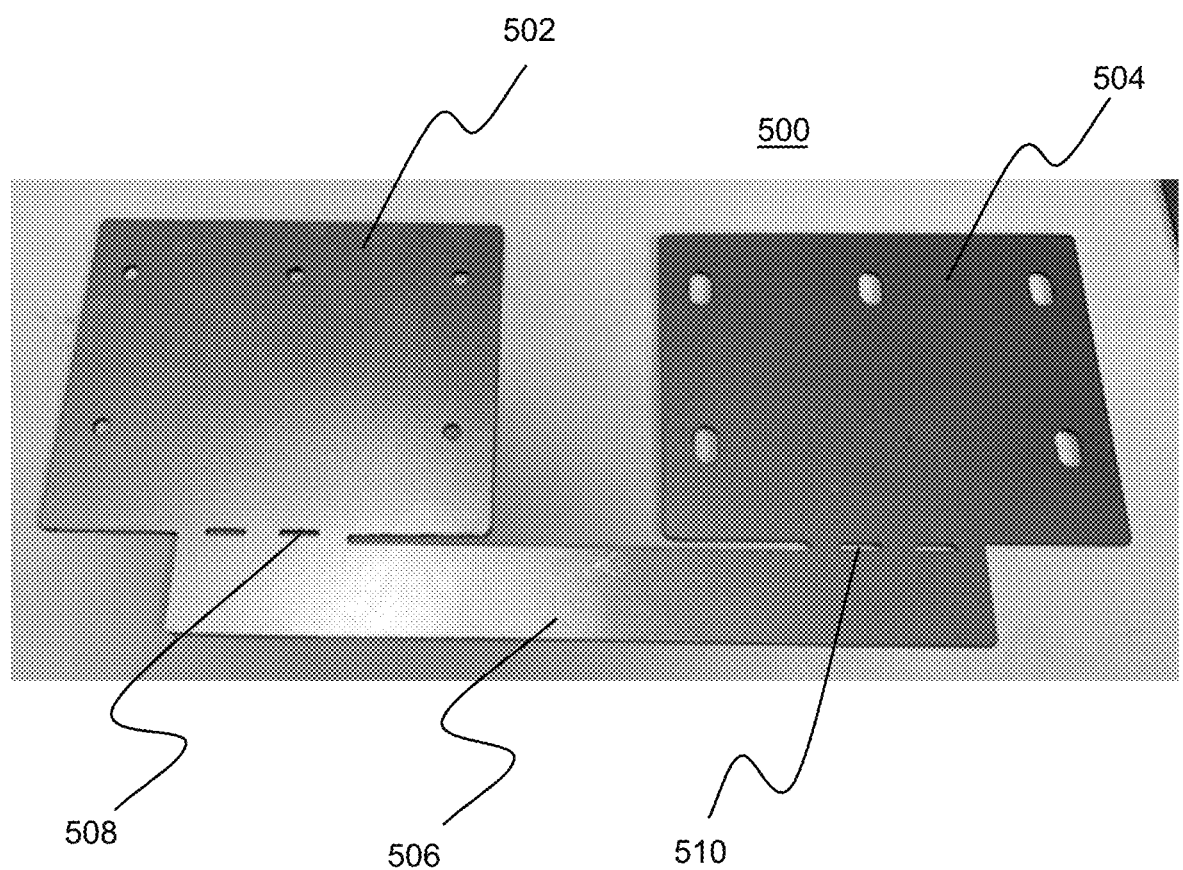
FIG. 5 illustrates a fabrication method for various embodiments.

FIG. 5 illustrates a fabrication method for various embodiments. In FIG. 5, a sheet metal 500 may be configured as a single piece of sheet metal having a first flat portion 502 and a second flat portion 504. Between the first flat portion 502 and the second flat portion 504 may be a flat rectangular portion 506. The flat rectangular portion 506 may include a first slotted joint 508 coupled to the first flat portion 502 and a second slotted join 510 coupled to the second flat portion 504. The sheet metal 500 shown in FIG. 5, may be considered to be an example of a flattened out structural collar (e.g., similar to 2 dimensional view of the previous described structural collars 102, 304, 402 and 410) prior to being folded into the structural collar as shown and described previously (structural collars 102, 304, 402 and 410). In the example, the first flat portion 502 may be folded along the first slotted joint 508 and the second flat portion 504 may be folded along the second slotted joint 510. The angle of the fold may be based, at least in part, on the angle of the roof as previously described (e.g., angles to substantially correspond to the angles of the roof 202 and 208). As described, utilization of a structural collar and systems described in the disclosed subject matter may result in facilitating lateral support strength for various support apparatus.

It should be appreciated that it is contemplated within the scope and spirit of the present disclosure that the claimed subject matter may include a wide variety of support apparatus, attachment mechanisms, and material such as, but not limited to, metals, polymers, brackets, bolts, fibers, fibrous material, screws, clamps, etc. Accordingly, the claimed subject matter is not limited in these respects.

The sheet metal 500 shown in FIG. 5 may be of a variety of material such as, but not limited to, carbon steel, aluminum, stainless steel, galvanized steel, brass, copper, bronze, and the like. Additionally, the sheet metal 500 may be of a range of thicknesses such as, but not limited to, 7 gauge to 28 gauge. Accordingly, the claimed subject matter is not limited in these respects.

In some portions of the description, illustrative implementations of the disclosure may have been described with reference to the elements of the components described with respect to FIGS. 1-5. However, the described embodiments are not limited to these depictions. More specifically, some elements/components depicted in FIGS. 1-5 may be omitted from some implementations detailed herein. Furthermore, other elements not depicted in FIGS. 1-5 may be used to implement example apparatuses detailed herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A bracket for providing lateral stability for a substantially vertical strut configured to pass through an existing roof, the bracket comprising:
   a sheet metal having a first substantially flat portion and a second a second substantially flat portion, the first substantially flat portion and the second substantially flat portion having holes configured to facilitate substantial alignment of the first substantially flat portion and the second substantially flat portion on top of each other, the first substantially flat portion and the second substantially flat portion having an angle substantially matching an angle of the existing roof; and
   a bend portion between the first substantially flat portion and the second substantially flat portion, the bend portion configured to substantially wrap around a body of the substantially vertical strut and to bind against at least two pinch points around the body of the substantially vertical strut when the first substantially flat portion and the second substantially flat portion are substantially aligned, the substantially vertical strut configured to provide support for an object above the existing roof and be attachable to a load bearing structure supporting the existing roof.

2. The apparatus of claim 1, wherein the first substantially flat portion comprises substantially circular holes.

3. The apparatus of claim 1, wherein the second substantially flat portion comprises substantially elliptical holes.

4. The apparatus of claim 1, wherein the substantially vertical strut comprises an elevated roof support strut.

5. The apparatus of claim 4, wherein the elevated roof support strut comprises a SkyLift™ riser.

6. The apparatus of claim 1, wherein the body of the substantially vertical strut comprises a substantially tubular body.

7. The apparatus of claim 6, wherein the bend portion comprises a substantially circular bend portion.

8. A method of forming a structural collar for providing lateral stability for a substantially vertical strut configured to pass through an existing roof from a single sheet metal, the method comprising:
   forming a first substantially flat portion;
   forming a second substantially flat portion;
   forming a substantially rectangular portion, the rectangular portion configured to couple the first substantially flat portion at one end and the second substantially flat portion at an opposite end;
   bending the rectangular portion to substantially match a body of a substantially vertical strut; and
   bending the first substantially flat portion and the second substantially flat portion at an angle relative to a vertical reference of the body of the substantially vertical strut, the angle substantially matching an angle of the existing roof and the substantially vertical strut configured to provide support for an object above the existing roof and be attachable to a load bearing structure supporting the existing roof.

9. The method of claim 8 further comprising drilling substantially circular holes in the first substantially flat portion.

10. The method of claim 8 further comprising drilling substantially elliptical holes in the second substantially flat portion.

11. The method of claim 8, wherein bending the rectangular portion comprises bending the rectangular portion to substantially match a body of an elevated roof support strut.

12. The method of claim 11, wherein bending the rectangular portion to substantially match the body of the elevated roof support strut comprises bending the rectangular portion to substantially match the body of a SkyLift™ riser.

13. The method of claim 8, wherein bending the rectangular portion comprises bending the rectangular portion to substantially match a tubular body of the support strut.

14. The method of claim 8, wherein the sheet metal comprises a sheet metal having a thickness of approximately 0.125 inch.

* * * * *